(12) United States Patent
LaPresti

(10) Patent No.: US 12,085,172 B2
(45) Date of Patent: Sep. 10, 2024

(54) SELF-CURING THERMOHYDRODYNAMIC SEAL

(71) Applicant: MAE Technical Advisory LLC, Greensburg, PA (US)

(72) Inventor: Michael LaPresti, Greensburg, PA (US)

(73) Assignee: MAE Technical Advisory LLC, Greensburg, PA (US)

( * ) Notice: Subject to any disclaimer, the term of this patent is extended or adjusted under 35 U.S.C. 154(b) by 0 days.

(21) Appl. No.: 18/074,754

(22) Filed: Dec. 5, 2022

(65) Prior Publication Data

US 2023/0175588 A1 Jun. 8, 2023

Related U.S. Application Data

(60) Provisional application No. 63/285,641, filed on Dec. 3, 2021.

(51) Int. Cl.
*F16J 15/34* (2006.01)
(52) U.S. Cl.
CPC .................. *F16J 15/3412* (2013.01)
(58) Field of Classification Search
CPC .................................................. F16J 15/3412
See application file for complete search history.

(56) References Cited

U.S. PATENT DOCUMENTS

| | | | | |
|---|---|---|---|---|
| 3,061,319 | A | 10/1962 | Snyder | |
| 4,290,613 | A * | 9/1981 | Scott | F16J 15/3432 277/408 |
| 4,365,815 | A * | 12/1982 | Scott | F16J 15/342 277/408 |
| 4,424,973 | A * | 1/1984 | Heilala | F16J 15/3492 277/318 |
| 4,575,100 | A * | 3/1986 | Hay, II | F16J 15/40 277/411 |
| 4,714,257 | A * | 12/1987 | Heinrich | B32B 18/00 277/306 |
| 5,013,051 | A | 5/1991 | Hilaris et al. | |
| 5,499,824 | A * | 3/1996 | Salant | F16J 15/3432 277/400 |
| 6,213,473 | B1 * | 4/2001 | Lebeck | F16J 15/342 277/408 |
| 11,333,251 | B2 * | 5/2022 | Salant | F16J 15/3496 |
| 11,396,946 | B2 * | 7/2022 | Wahl | F16J 15/3432 |
| 2014/0327211 | A1 | 11/2014 | Khonsari et al. | |
| 2015/0198252 | A1 | 7/2015 | Jason et al. | |
| 2015/0381010 | A1 | 12/2015 | Kobes et al. | |

* cited by examiner

*Primary Examiner* — Vishal A Patel
(74) *Attorney, Agent, or Firm* — The Webb Law Firm

(57) ABSTRACT

A seal assembly, having: a mating ring; a stationary seal ring having a sealing surface and a seat surface; and a primary seal assembly; where the mating ring contacts the sealing surface of the seal ring and the primary seal assembly at least partially surrounds the seal ring and at least partially contacts the seat surface.

8 Claims, 7 Drawing Sheets
(2 of 7 Drawing Sheet(s) Filed in Color)

SELF-CURING THERMOHYDRODYNAMIC SEAL

CROSS-REFERENCE TO RELATED APPLICATIONS

This application claims priority to U.S. Provisional Patent Application No. 63/285,641 filed Dec. 3, 2021, the disclosure of which is hereby incorporated by reference in its entirety.

BACKGROUND OF THE INVENTION

Field of the Invention

The present disclosure relates to mechanical seals and bearings, and more particularly, to hydrodynamic rotary seals.

Description of Related Art

Mechanical seals are widely used to provide a seal between a stationary housing, often containing a fluid such as oil, and a rotating shaft that passes through the housing. Typically, such seal assemblies include a stationary seal ring (e.g., a stator) about the shaft but fixed to the housing, and another seal ring (e.g., a mating ring or a rotor), which rotates with the rotating shaft.

Contact between the stator and rotor during operation may create heat as a result of frictional effects between the components. Due to friction, such contact causes heat to be generated within the seal seat and increases the temperature of the seal seat. If the amount of heat is undesirable, it could potentially reduce the life of or damage the seal, which could cause undesired deformation with respect to the sealing faces of the rotor and/or stator, and could potentially impair other nearby components.

Hydrodynamic seals attempt to reduce friction by including grooves or other features of some form in one or both sealing faces. Other attempts have been made to mitigate the heat with the introduction of cooling lubricant at a side of the seal seat opposite the side in contact with the nonrotating seal assembly, the cooling lubricant only provides localized cooling relief on the non-contacting side of the seal seat.

In view of the foregoing, a need exists for a mechanical seal that accommodates high pressures, mechanical loads, bearing applications, and rotational speeds with passively-actuated hydrostatic and hydrodynamic lift mechanisms. A further need exists for hydrodynamic "Dry Gas Seals" that generally utilize complex geometry machined into the seal faces using laser etching or other complex manufacturing processes.

SUMMARY OF THE INVENTION

In an embodiment, a seal assembly, having: a mating ring; a stationary seal ring having a sealing surface and a seat surface; and a primary seal assembly; where the mating ring contacts the sealing surface of the seal ring and the primary seal assembly at least partially surrounds the seal ring and at least partially contacts the seat surface.

In another embodiment, the seal ring includes at least one thermohydrodynamic conductor location forming a recess, the conductor being accessible through the seat face.

In another embodiment, the conductor is a cooling channel.

In another embodiment, the seal ring surface is flat and homogeneous.

In another embodiment, the seal ring sealing surface is resiliently configured to deform to a circumferentially wavy profile.

In another embodiment, the seal ring is made of a hard material like silicon carbide and the seal face is made of a softer material.

In another embodiment, the seal ring sealing surface is resiliently configured to deform to a curvilinear convergent profile.

In another embodiment, a seal assembly, having: a mating ring; a stationary seal ring having a sealing surface and a seat surface, the seal ring surface being flat and homogeneous, the seat surface having at least one opening; and a primary circumferential seal assembly; where the mating ring contacts the sealing surface of the seal ring and the primary seal assembly at least partially surrounds the seal ring and at least partially contacts the seat surface.

In another embodiment, the at least one opening is a thermohydrodynamic conductor forming a recess.

In another embodiment, the conductor is a cooling channel.

In another embodiment, the seal ring sealing surface is resiliently configured to deform to a circumferentially wavy profile.

In another embodiment, the seal ring sealing surface is resiliently configured to deform to a curvilinear convergent profile.

In another embodiment, the seal ring is made of a hard material like silicon carbide and the seal face is made of a softer material.

In another embodiment, the at least one opening is covered by a surface of the primary seal assembly.

In another embodiment, a self-curing thermohydrodynamic ring, having: a sealing surface having at least one opening and a seal ring surface being flat and homogeneous; where the seal ring is configured to deform under stress.

In another embodiment, the seal ring is made of a hard material and the seal face is made of a soft material, the hard material being harder than the soft material.

In another embodiment, the surface of the seal ring is configured to contact a mating ring surface and a primary seal assembly at least partially surrounds the seal ring and at least partially contacts the seat surface.

In another embodiment, the self-curing thermohydrodynamic ring further has at least one opening being a thermohydrodynamic conductor forming a recess.

In another embodiment, the seal ring sealing surface is resiliently configured to deform to a circumferentially wavy profile.

In another embodiment, the seal ring sealing surface is resiliently configured to deform to a curvilinear convergent profile.

BRIEF DESCRIPTION OF THE DRAWINGS

The patent or application file contains at least one drawing executed in color. Copies of this patent or patent application publication with color drawings will be provided by the Office upon request and payment of the necessary fee.

DESCRIPTION OF THE INVENTION

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The seal assembly 1 advantageously accommodates high pressures and high rotational speeds with passively-actuated hydrostatic and hydrodynamic lift mechanisms. The seal assembly 1 advantageously provides a cost-effective sealing solution for applications requiring high pressure and speed with marginal or no lubrication.

Figure 1:
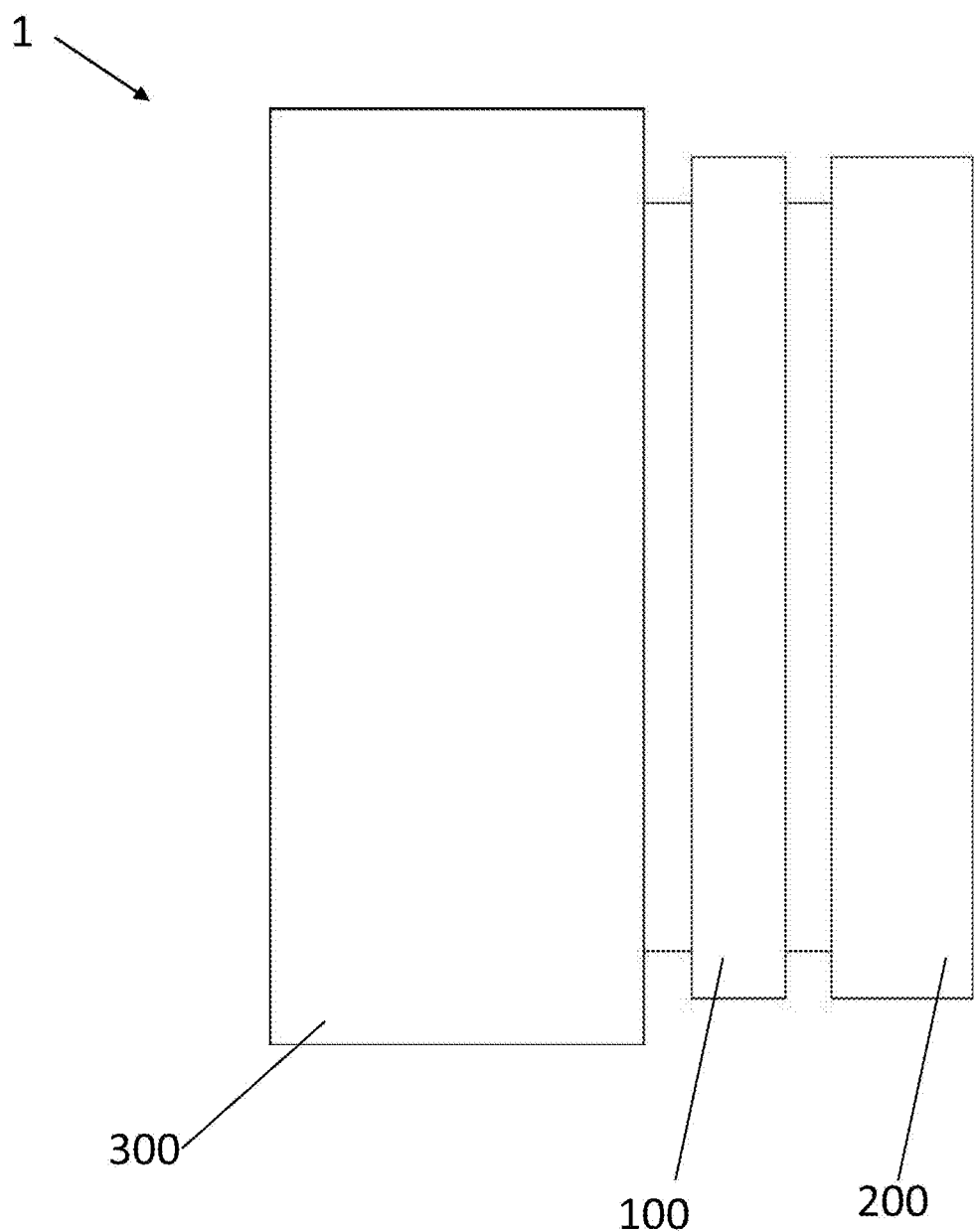
FIG. 1 displays a side view of an exemplary embodiment of the seal assembly.

Referring to the drawings, FIG. 1 generally displays an embodiment of a seal assembly 1. The seal assembly may include a seal ring 100, a mating ring 200, and a primary seal assembly 300. The seal ring 100 may be referred to herein as a stator 100. Mating ring 200 may also be referred to herein as a plate 200 or rotor 200. The mating ring 200 may be a one-piece carbide design. The seal ring 100 may be connected to the primary seal assembly 300 or a housing. The housing may include a metallic component, such as, for example, a bellows, and/or may include a non-metallic component such as an elastomer or plastic. The seal ring 100 may be machined or formed with machining tools, but is not limited to these processes. Advantageously, the seal ring 100 does not need to be formed with laser etching or the complexities of conventional seal production. The seal ring 100 may be made of any material, but is preferably made of a high-performance polyimide-based thermoplastic material which can withstand stresses traditional in aerospace, mechanical, and chemical environments. The hardness of the seal ring 100 and seal ring surface 130 may range from, but are not limited to, 22.9-31.9 HV. In a preferred embodiment, the hardness of the seal ring 100 and seal ring surface 130 are different.

Figure 2:
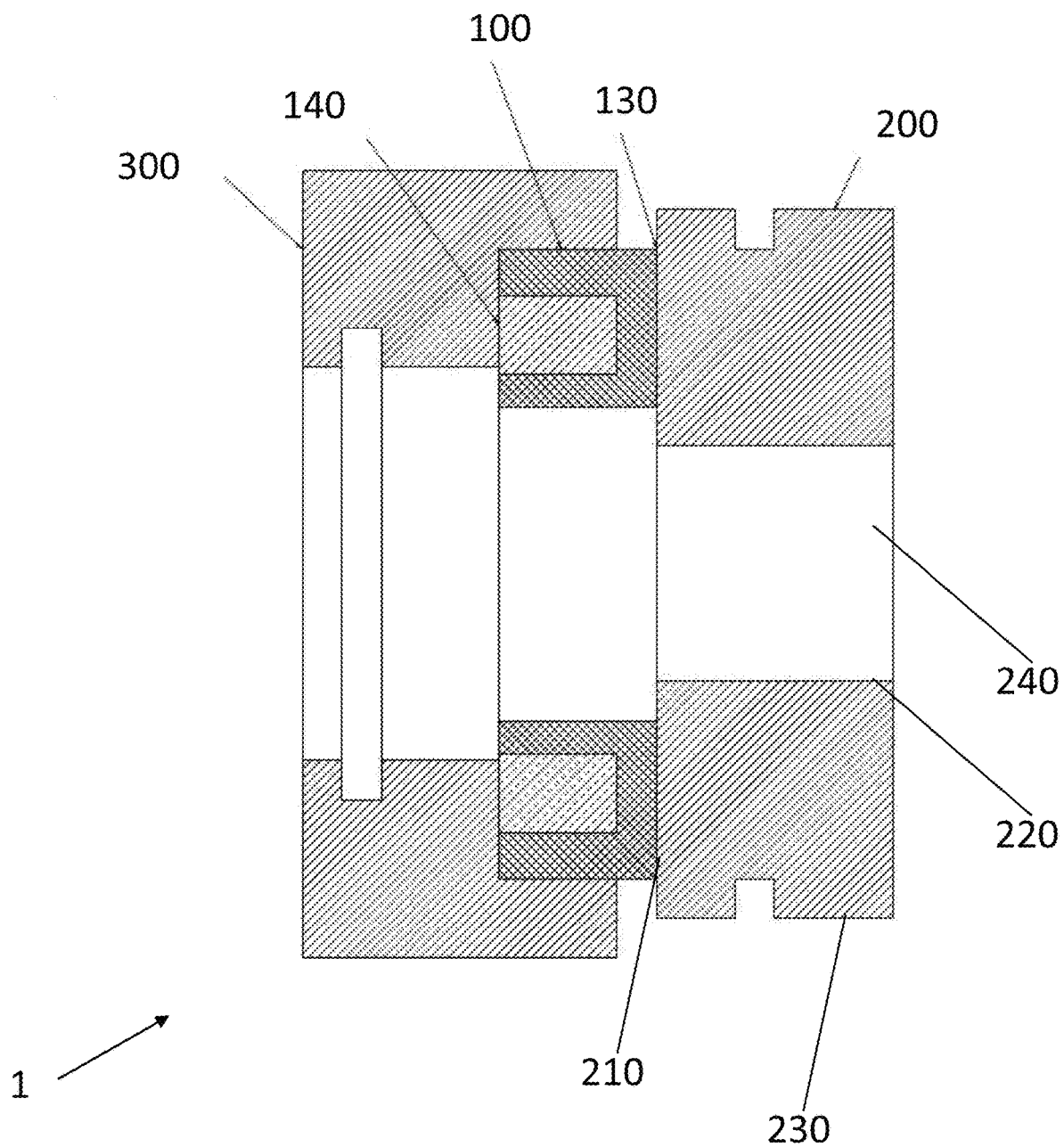
FIG. 2 displays a cross sectional side view of an exemplary embodiment of the seal assembly.

FIG. 2 generally displays a cross-section of the seal assembly 1. The mating ring 200 may include one or more of a variety of shapes, sizes, configurations, and/or materials. In one embodiment, the mating ring 200 may have a generally circular shape, and may include a radially outward portion/segment with a face 210 configured for mating or operating with a corresponding surface of the seal ring 100. The mating ring 200 has an inner diameter 220 and an outer diameter 230 with a through hole 240. The mating ring 200 may be configured to have a different shape for the face that mates with the seal ring 100 and the opposing side face. The opposing side face is configured to attach to and may be connected to another separate component or components. The mating ring 200 may be configured to rotate or move while in communication with the separate component or components. The surface 210 of the mating ring 200 which is configured for operational communication with a corresponding surface sealing surface 130 of the sealing ring 100, may include a pattern, grooves, or texture.

Figure 3:
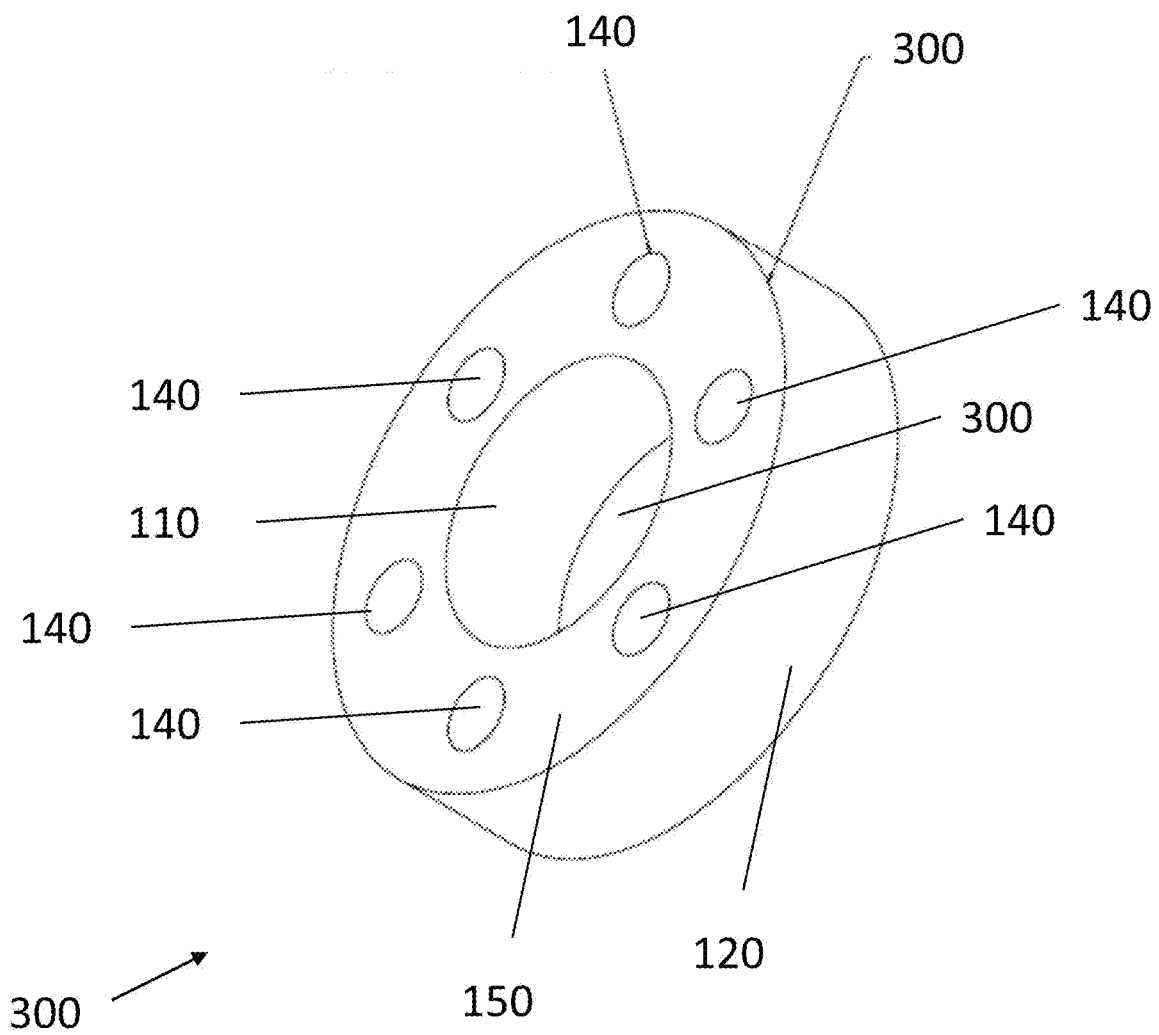
FIG. 3 displays an isometric view of an exemplary embodiment of the seal and seat surface.
Figure 4:
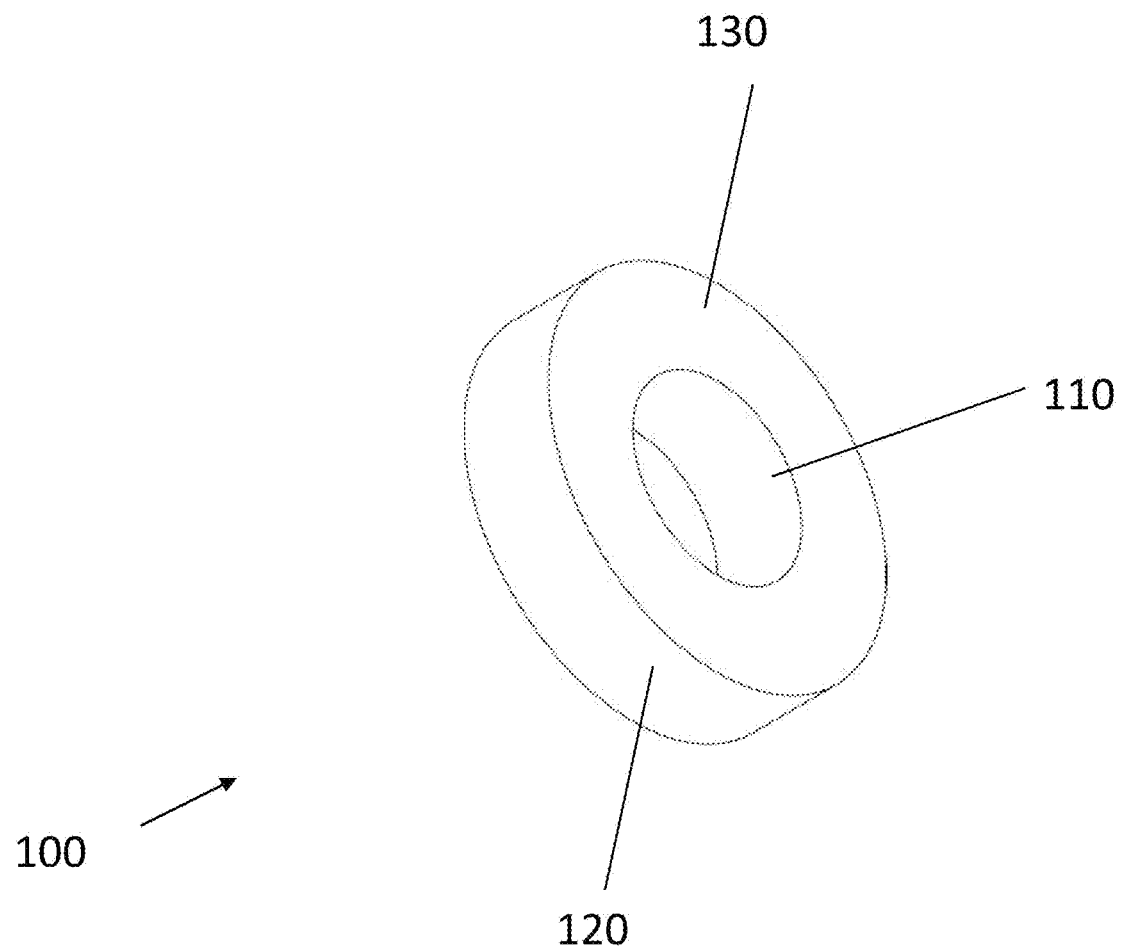
FIG. 4 displays an isometric view of an exemplary embodiment of the seal and seal surface.

Further referring to FIGS. 2-4, an embodiment of a seal ring 100 is generally displayed. The seal ring 100 may be generally circular in shape. Viewed in cross section (such as generally displayed), the seal ring 100 may include a generally rectangular form or shape. The seal ring 100 may include an inner diameter 110, an outer diameter 120, and/or a sealing surface face 130. The seal ring 100 may be a single or unitary component. The sealing surface 130 may be configured for operational communication with a corresponding portion/segment of the mating ring 200. The sealing surface 130 may include an inner diameter 110, an outer diameter 120, and/or a radial width such as generally displayed.

The sealing surface face 130 may consist of a harder material, such as silicon carbide, mated with a softer material like a carbon, composite, or thermoplastic. The softer seal face may consist of a material with a significantly lower elastic modulus and thermal conductivity than the harder material. The combination of the harder material and softer material being shaped may create a feedback being stable and self-regulating in terms of generating more hydrostatic and hydrodynamic load support in response to an applied load, pressure difference, or speed. The combination of materials advantageously allows the seal assembly 1 to accommodate dry running conditions at much higher speeds than with traditional mechanical seals.

In one embodiment, the sealing face 130 and mating ring surface 210 are substantially flat and homogeneous through the sections, and are axisymmetric. A profile 160, as exemplary shown in FIGS. 5-7, of the sealing face 130 and mating ring surface 210, do not have any notable changes in surface elevation and align together substantially flat and uniform to form a seal against one another. Lift-off features may or may not be present or applied. When no speed or pressure are applied to the assembly, the sealing face 130 and mating ring surface 210 mate with one another and rest flat against one another. When speed and differential pressure are applied and increase friction is created between the surfaces 130, 210. The increase in friction produces an increase in heat by the surfaces 130, 210. Advantageously, the low conductivity and elastic modulus of the softer face of the sealing surface 130 deforms, forming a profile 160, into a curvilinear convergent geometry that improves or increases hydrostatic lift. The profile 160 may also be a five point (fish eye) perspective or any similar shape having distortion. The deformation may be gradual. As speed and pressure are increased, the deformation may increase in size or shape, altering the face profile 160 of the surface 130. The increase in deformation may be linear or exponential when compared to the increase in speed or pressure. As the load increases further, the magnitude of the effect experiences a corresponding increase to offset the applied load. The increase in hydrostatic lift may reduce the increase in heat generated from friction as the load increases. Further, as the pressure difference increases, Joule Thompson cooling may cause a decrease in the fluid temperature across the seal faces 130, 210 that advantageously cools the assembly 1 and further mitigates overheating. Advantageously, as the seal ring 100 approaches complete lift-off, the friction generated is decreased and prevents further convergent tapering, providing an upper limit that yields a stabilizing effect on the surfaces 130, 210.

Another embodiment is shown in FIGS. 2-4. Internal thermohydrodynamic features or conductors 140 are introduced into one or both of the faces 150, 130. The thermohydrodynamic features 140 may include design features such as internal voids, conformal cooling channels, or embedded materials with different thermal properties such as, but not limited to, thermal conductivity, heat capacity, or density. The thermohydrodynamic features 140 may be introduced by conventional machining or additive manufacturing techniques. The conductors 140 may be any shape, depth, or size configured to deform the seal ring 100 such that a desired surface geometry is created on the seal ring surface 150, 130. Although not shown in the FIGS, the thermohydrodynamic features or conductors 140 may be any shape or size. The conductors 140 may be internally connected or in fluid communication with one another. The conductors 140 are accessible from the face of the sealing ring 100 which is contacted with the primary seal assembly 300. The thermohydrodynamic conductors 140 may not penetrate the entire thickness of the seal ring 100 but instead are fitted into a blind hole. The seal ring 100 may have one or multiple conductors 140 formed circumferentially around the seal ring 100. The conductors 140 may be evenly spaced around the seal ring 140 or distributed to reduce the sensitivity of the seal to wear and encourages longevity, reliability, and stability. When no speed or pressure are applied to the assembly, the sealing face 130 and mating ring surface 210 mate with one another and rest flat against one another. When speed and differential pressure are applied and increase friction is created between the surfaces 130, 210. The increase in friction produces an increase in heat by the surfaces 130, 210. Advantageously, the circumferentially varying thermal resistance causes the seal face to develop a circumferentially wavy profile 160 that creates hydrodynamic lift. The hydrodynamic lift may even be developed at no differential pressure. The profile 160 of the sealing face 130 may be wavy, tapered, saddle-shaped, or any other pattern. The profile 160 deformation may occur because of, but is not limited to, the number, location, size, shape, or properties of the conductors 140. Heat dissipation may occur at a different rate around the sealing ring 100 because of the conductors 140 to form a shape or pattern in the sealing surface 130 profile 160. In a preferred embodiment, the deformation profile 160 of the sealing face 130 creates a radial or circumferential displacements that encourage lubrication of the seal faces 130, 210 and generate hydrodynamic or aerodynamic pressure and fluid circulation which decreases the temperature of the surfaces.

The seal ring 100 exhibits a self-curing behavior that resists elimination of the hydrodynamic or hydrostatic deformations on the seal faces 130. At lightly contacting conditions, the radial taper or wavy profile 160 could tend to gradually wear away. However, the wear will result in a loss of lift that will increase face contact force and again increase friction heat. The higher friction heat will further deform the seal ring 100 and restore the favorable hydrostatic and/or hydrodynamic geometry until lightly contacting or lift-off conditions are restored at the equilibrium thermal state. This effect reduces the sensitivity of the seal 100 to wear and encourages longevity, reliability, and stability. The rate of deformation of the seal 100 and alteration in the profile 160 may be linear or exponential in reference to the rate of increase in external stresses.

Figure 5:
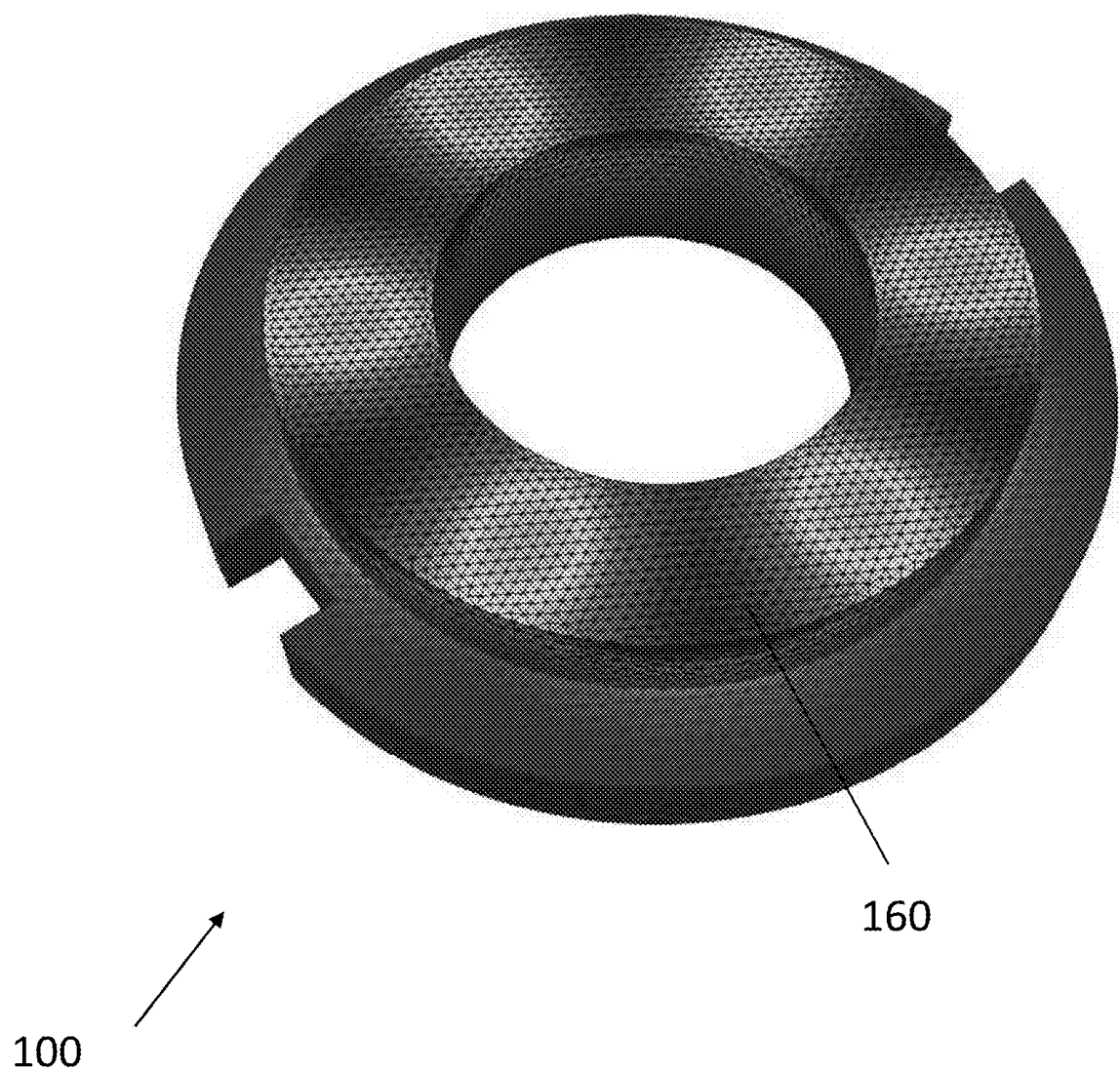
FIG. 5 displays an isometric colored view of an exemplary embodiment of the seal assembly with a varying temperature profile.
Figure 6:
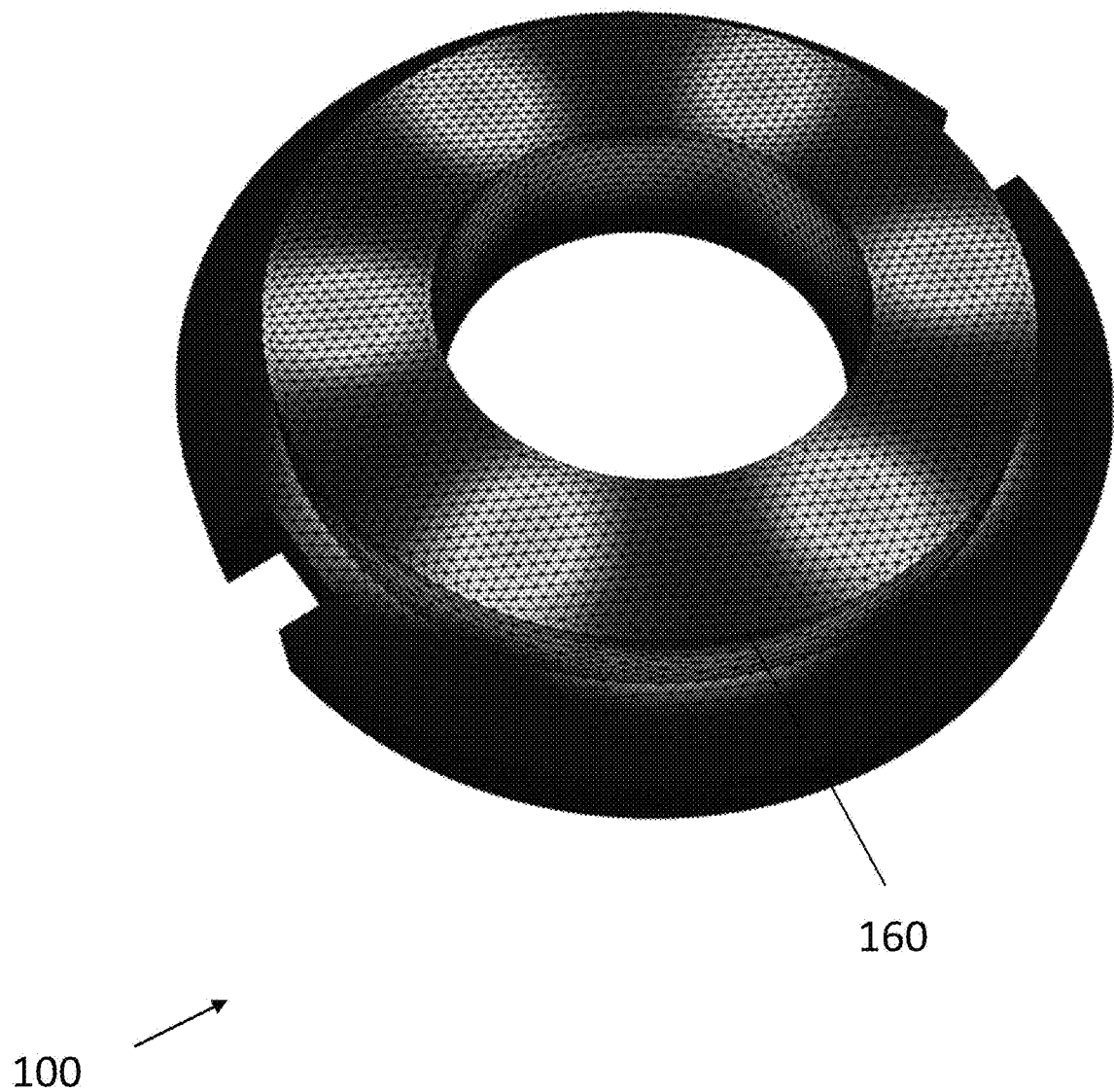
FIG. 6 displays an isometric greyscale view of an exemplary embodiment of the seal assembly with a varying temperature profile.
Figure 7:
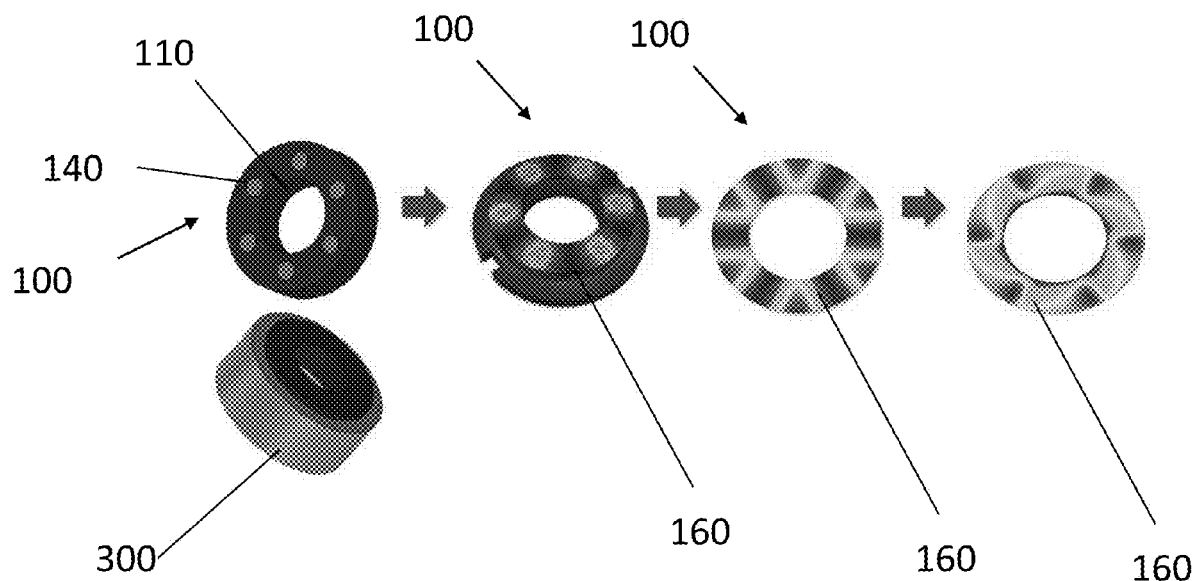
FIG. 7 displays an isometric colored view of an exemplary embodiment of the seal assembly with a varying deformation profile.

FIGS. 5-7 show a simulation results of the thermal profile 160 developing in the seal ring 100 due to the presence of the thermohydrodynamic conductors 140. Due to its comparatively high thermal conductivity, the seal ring 100 and profile 160 may deform into a wavy shape that corresponds to the illustrated thermal profile 160. Advantageously, the deformed wavy shape generates hydrodynamic and hydrostatic lift that increases load and speed capability of the device 1.

While aspects of a seal assembly are shown in the accompanying figures and described hereinabove in detail, other aspects will be apparent to, and readily made by, those skilled in the art without departing from the scope and disclosure of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A seal assembly, comprising:
a mating ring;
a stationary seal ring having a sealing surface and a seat surface;
the seal ring sealing surface being flat and homogeneous;
the seat surface having at least two thermohydrodynamic conductors, the at least two thermohydrodynamic conductors forming at least a first recess and a second recess; and
a primary circumferential seal assembly,
wherein the mating ring contacts the sealing surface of the seal ring and the primary seal assembly at least partially surrounds the seal ring and at least partially contacts the seat surface, and wherein-the first recess comprises a first material and the second recess comprises a second material, the first material and the second material being different materials.

2. The seal assembly of claim 1, wherein the conductor is a cooling channel.

3. The seal assembly of claim 1, wherein the seal ring sealing surface is resiliently configured to deform to a circumferentially wavy profile.

4. The seal assembly of claim 1, wherein the seal ring sealing surface is resiliently configured to deform to a curvilinear convergent profile.

5. The seal assembly of claim 1, wherein the seal ring is made of a different material than the sealing surface.

6. The seal assembly of claim 1, wherein the at least one opening is covered by a surface of the primary seal assembly.

7. The seal assembly of claim 1, wherein the seat surface is made of a hard material and the sealing surface is made of a soft material, the hard material being harder than the soft material.

8. The seal assembly of claim 1, wherein the seal ring is made of a different material than the seal surface.

* * * * *